Feb. 11, 1930.   G. R. METCALF, JR   1,746,956
CONDUIT COUPLING
Filed June 8, 1927
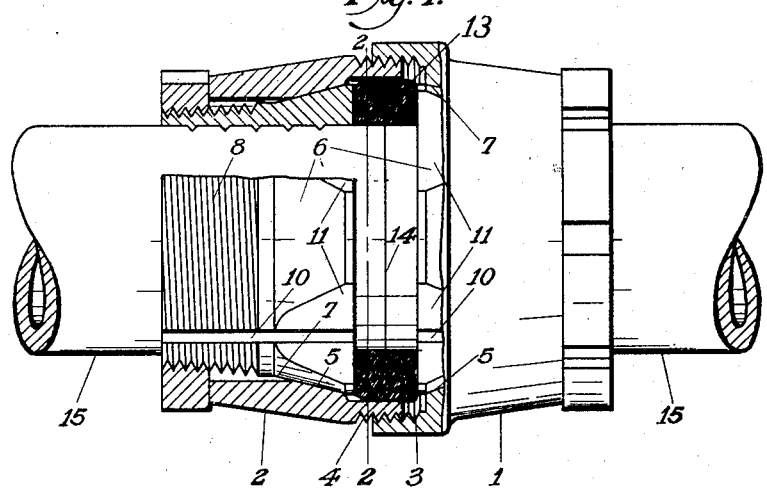
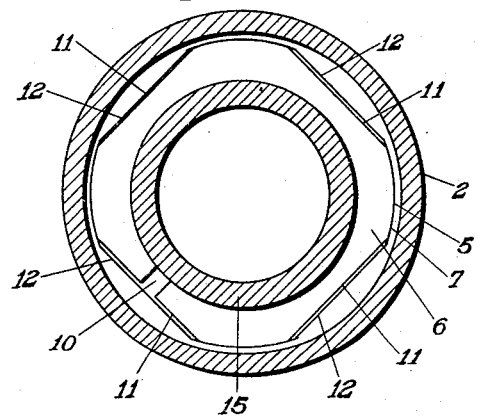
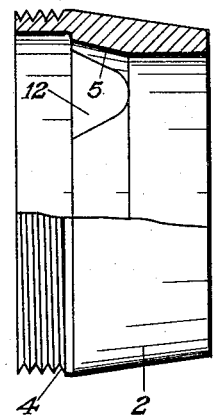
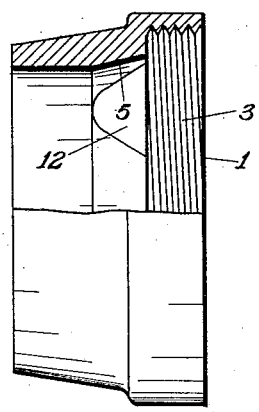
George R. Metcalf Jr.
INVENTOR.
BY N. L. Lord
ATTORNEYS.

Patented Feb. 11, 1930

1,746,956

UNITED STATES PATENT OFFICE

GEORGE R. METCALF, JR., OF ERIE, PENNSYLVANIA, ASSIGNOR TO ERIE MALLEABLE IRON COMPANY, OF ERIE, PENNSYLVANIA, A CORPORATION OF PENNSYLVANIA

CONDUIT COUPLING

Application filed June 8, 1927. Serial No. 197,474.

This invention is particularly designed to connect threadless conduits but it may be used in other connections. Such connections have heretofore been made utilizing contractible tapered sleeves with their larger ends arranged toward the center of a surrounding body. Different means may be provided for so arranging the body that the parts may be readily assembled and the present structure affords a convenient means for accomplishing this purpose and at the same time a convenient means for sealing the coupling. Features and details of the invention will appear from the specification and claims.

A preferable exemplification of the invention is illustrated in the accompanying drawings as follows:—

Fig. 1 shows a side elevation, partly in section.

Fig. 2 a section on the line 2—2 in Fig. 1.

Fig. 3 a side elevation, partly in section, of one part of the body of the coupling.

Fig. 4 a side elevation, partly in section of the other part of the body.

The body is made up of the two parts, 1 and 2, the part 1 being provided with a female thread 3 at the inner end and the part 2 with a male thread 4 at the inner end, these being screwed through forming a screw connection between the parts of the body. Each part of the body has wedging surfaces 5 converging toward the outer end of the fitting.

A contractible sleeve 6 has a wedging surface 7 engaging the surface 5, the wedging engagement of these surfaces contracting the sleeve as the sleeve is forced endwise. The outer end of the sleeve is screw-threaded at 8 and a nut arranged on the outer end acts to draw the sleeve endwise to effect the contraction of the sleeve through the action of the wedging surfaces. The sleeve is made readily contractible by a longitudinal slot 10 which extends entirely through the sleeve. The sleeve is also provided with a series of flats 11 which correspond to flats 12 in the body portion, thus locking the sleeve against turning.

A gasket 13 is placed in the space between the ends of the sleeves and in position to cover the joint between the parts 1 and 2, also to cover the joint 14 formed between the ends of inserted conduits 15.

The screw-threaded connection affords a very simple means of connecting the end parts of the body portion and affords a means also of tightening or compressing the gasket so as to completely seal the joint.

What I claim as new is:—

1. In a conduit coupling, the combination of a tubular member formed of united parts, each part having a continuous integral annular wall, the parts being united at their inner ends by a screw-threaded connection; a contractible slitted sleeve in each part having a wedging surface engaging the inner surface of the part containing the sleeve and a screw-threaded outer end; and nuts on the outer ends of the sleeves drawing the sleeves into wedging engagement with the converging surfaces to contract the sleeves.

2. In a conduit coupling, the combination of a tubular member formed of united parts, each part having a continuous integral annular wall, the parts being united at their inner ends by a screw-threaded connection; a contractible slitted sleeve in each part having a wedging surface engaging the inner surface of the part containing the sleeve and a screw-threaded outer-end; nuts on the outer ends of the sleeves drawing the sleeves into wedging engagement with the converging surfaces to contract the sleeves; and a gasket between the ends of the sleeves covering the joint between the parts of the body.

In testimony whereof I have hereonto set my hand.

GEORGE R. METCALF, JR.